Oct. 20, 1953        L. IRRGANG        2,656,193
JAW KEYING MEANS FOR CHUCK DEVICES
Filed Nov. 30, 1951
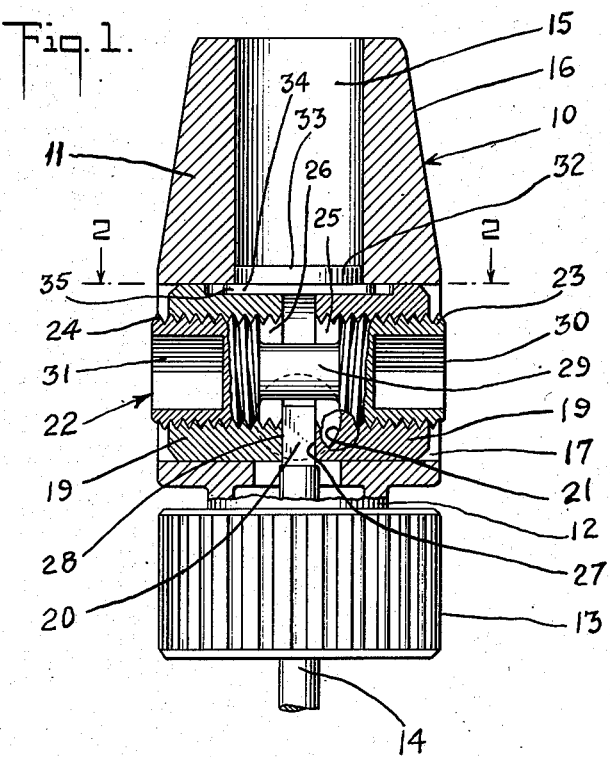
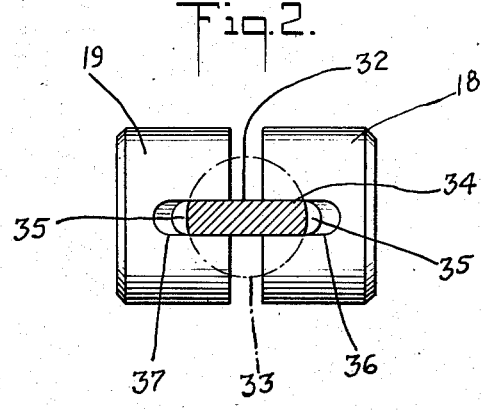
INVENTOR
LOUIS IRRGANG
BY
ATTORNEY Patented Oct. 20, 1953

2,656,193

UNITED STATES PATENT OFFICE 2,656,193

JAW KEYING MEANS FOR CHUCK DEVICES

Louis Irrgang, Jersey City, N. J., assignor to Ettco Tool Co., Inc., Brooklyn, N. Y., a corporation of New York Application November 30, 1951, Serial No. 259,100

10 Claims. (Cl. 279—66)

1

This invention relates to chuck devices having means for retaining the tool keying jaws of the device against displacement and rotation in the chuck body. More particularly, the invention deals with a retaining means which is readily detachable from the chuck body and further provides a balanced chuck body. Still more particularly the invention includes means for balancing the tool keying jaws in said body.

The novel features of the invention will be best understood from the following description when taken together with the accompanying drawings in which certain embodiments of the invention are disclosed, and in which the separate parts are designated by suitable reference characters in each of the views, and in which:

Fig. 1 shows a side and sectional view of a chuck device made according to my invention with parts of the construction broken away and in section.

Fig. 2 is a section on the line 22 of Fig. 1, omitting parts of the construction.

In chuck devices of the kind under consideration it has been the common practice to employ key screws or key pins to retain the tool keying jaws against displacement and rotation in the body of the chuck. Structures of this type and kind have been expensive and further result in creating in the chuck body an unbalanced condition which in high speed operation of the chuck can result in producing undesirable vibratory movement.

It is the purpose of my invention to provide a chuck device, first with a very simple and economical means of retaining the tool keying jaws against displacement from the chuck body as well as against rotation therein, and further a means which can be quickly attached and detached with respect to the body. Still further is the purpose of my invention to provide such a means which establishes a balanced condition of the chuck body, which balanced condition is further facilitated by providing, at opposed ends of the feed screw, similar key sockets so that the feed screw becomes also balanced in so far as distribution of weight is concerned within the chuck body.

In Fig. 1 of the drawing I have shown partly in side elevation and partly in section a drill chuck generally identified by the reference character 10. This chuck comprises a chuck body 11 on the reduced portion 12 of which is rotatably mounted the usual milled sleeve 13 for actuating gripper jaws of the chuck, not shown, to grip the shank of a tool partly seen at 14 in Fig. 1.

2

The body 11 has a central bore 15 which opens through the upper contracted end 16 of the body and also downwardly through the reduced extension 12. The body 11 has a large diameter transverse bore 17 which opens through opposed sides of said body as clearly seen in Fig. 1 and in which the tool keying jaws 18 and 19 are mounted. Inner ends of these jaws are adapted to engage the inner square end 20 of the tool 14 to definitely key the tool 14 against rotation in the chuck body, it being understood that the tool is also gripped by the jaws actuated by the sleeve 13 as in other devices of this type and kind. At right angles to the bore 17 the body 11 has opposed apertures, one of which is seen at 21 in Fig. 1 of the drawing. The apertures 21 open into the bore 17 at the lower portion thereof so as to give vision to the inner square end 20 of the tool.

Eccentrically disposed in the jaws 18 and 19 is a jaw operating screw 22 having left and right threaded end portions 23 and 24 engaging correspondingly threaded bores 25 and 26 of the jaws 18 and 19. By disposing the screw 22 eccentrically in the jaws, or in other words nearer the upper portions thereof than the lower portions, relatively thick gripping surfaces 27 and 28 are provided on the jaws 18 and 19 for engagement with the square end 20. The threaded ends 23 and 24 are joined by a reduced bridging portion 29 which allows the square end 20 to extend a reasonably long distance into the bore 17. The ends of the screw 22 have similar rectangular sockets 30 and 31 to receive a tool for rotating the screw in moving the jaws 18 and 19 into operative and inoperative positions. By providing these sockets at both ends of the screw a more balanced condition of the entire chuck device is provided with respect to distribution of weight which avoids vibration in high speed operation of the chuck device.

Considering now Fig. 2 of the drawing here a view of the jaws 18 and 19 is shown detached with respect to the chuck body 11 with the section taken through the retaining member or element 32 which is employed to prevent displacement of the jaws 18 and 19 from the chuck body 11 as well as to key the jaws against rotation in the bore 17. The member or element 32 comprises a disc 33, note Fig. 1, which fits snugly in the lower portion of the bore 15. The lower surface of the disc has a transverse key bar 34, the bar having ends 35 protruding beyond the disc 33, thus retaining the element 32 in the lower portion of the bore 15. The bar 34 operates in key recesses 36 and 37 in the jaws 18 and 19.

These key recesses being sufficiently long to facilitate movement of the jaws into close position with respect to each other to engage the square end of a relatively small diameter tool as well as to the extent to engage square ends of tools of large diameters within the capacity of the chuck.

From the foregoing it will be apparent that while the jaws 18 and 19 are free to move longitudinally of the key bar 34 they are checked in this movement by engaging the ends 35. In attaching and detaching the element or member 32 the jaws 18 and 19 are extended to a position facilitating removal thereof from the bore 17, and when the same, including the screw 22, have been removed the member or element 32 can be removed from or inserted into the bore 17 for positioning in the bore 15. By using the retaining and keying element 32 a practical balanced condition is provided in the chuck devices with respect to weight displacement, and this is advantageous particularly with chuck devices operated at high speeds.

Having fully described my invention, what I claim as new and desire to secure by Letters Patent is:

1. A chuck device comprising a tubular chuck body, a pair of tool engaging jaw members mounted in and movable axially of a transverse bore in said body, a left and right hand screw element in threaded engagement with said jaws for moving said jaws toward and from each other in gripping and releasing a tool, said jaws having alined key grooves in the outer surface thereof and communicating at adjacent surfaces of the jaws, the upper portion of said body having a tapered bore communicating with said transverse bore, a key element, said key element having a disc portion arranged in the tapered bore of said body, and said element having a key bar arranged in said transverse bore and operating in the key grooves of said jaws to key the jaws against rotation in said body.

2. A chuck device comprising a tubular chuck body, a pair of tool engaging jaw members mounted in and movable axially of a transverse bore in said body, a left hand and right hand screw element in threaded engagement with said jaws for moving said jaws toward and from each other in gripping and releasing a tool, said jaws having alined key grooves in the outer surface thereof and communicating at adjacent surfaces of the jaws, the upper portion of said body having a tapered bore communicating with said transverse bore, a key element, said key element having a disc portion arranged in the tapered bore of said body, said element having a key bar arranged in said transverse bore and operating in the key grooves of said jaws to key the jaws against rotation in said body, and said body having another transverse bore at right angles to the first bore in alinement with lower adjacent portions of said jaws to render engagement of the jaws with a tool visible.

3. A chuck device comprising a tubular chuck body, a pair of tool engaging jaw members mounted in and movable axially of a transverse bore in said body, a left and right hand screw element in threaded engagement with said jaws for moving said jaws toward and from each other in gripping and releasing a tool, said jaws having alined key grooves in the outer surface thereof and communicating at adjacent surfaces of the jaws, the upper portion of said body having a tapered bore communicating with said transverse bore, a key element, said key element having a disc portion arranged in the tapered bore of said body, said element having a key bar arranged in said transverse bore and operating in the key grooves of said jaws to key the jaws against rotation in said body, said body having another transverse bore at right angles to the first bore in alinement with lower adjacent portions of said jaws to render engagement of the jaws with a tool visible, and the ends of said screw element having similar key sockets.

4. A chuck device comprising a tubular chuck body, a pair of tool engaging jaw members mounted in and movable axially of a transverse bore in said body, a left and right hand screw element in threaded engagement with said jaws for moving said jaws toward and from each other in gripping and releasing a tool, said jaws having alined key grooves in the outer surface thereof and communicating at adjacent surfaces of the jaws, the upper portion of said body having a tapered bore communicating with said transverse bore, a key element, said key element having a disc portion arranged in the tapered bore of said body, said element having a key bar arranged in said transverse bore and operating in the key grooves of said jaws to key the jaws against rotation in said body, and said screw element being eccentrically disposed in said jaws to provide wide gripper surfaces at lower portions thereof.

5. A chuck device comprising a tubular chuck body, a pair of tool engaging jaw members mounted in and movable axially of a transverse bore in said body, a left and right hand screw element in threaded engagement with said jaws for moving said jaws toward and from each other in gripping and releasing a tool, said jaws having alined key grooves in the outer surface thereof and communicating at adjacent surfaces of the jaws, the upper portion of said body having a tapered bore communicating with said transverse bore, a key element, said key element having a disc portion arranged in the tapered bore of said body, said element having a key bar arranged in said transverse bore and operating in the key grooves of said jaws to key the jaws against rotation in said body, said screw element being eccentrically disposed in said jaws to provide wide gripper surfaces at lower portions thereof, said screw element having a centrally reduced shank, and the key bar being of greater length than the diameter of said disc portion, and the axis of said screw element being offset upwardly with respect to the axis of said jaws to provide deep gripper surfaces at lower adjacent portions of said jaws.

6. A chuck device comprising a tubular chuck body a pair of tool engaging jaw members mounted in and movable axially of a transverse bore in said body, a left and right hand screw element in threaded engagement with said jaws for moving said jaws toward and from each other in gripping and releasing a tool, said jaws having alined key grooves in the outer surface thereof and communicating at adjacent surfaces of the jaws, the upper portion of said body having a tapered bore communicating with said transverse bore, a key element, said key element having a disc portion arranged in the tapered bore of said body, said element having a key bar arranged in said transverse bore and operating in the key grooves of said jaws to key the jaws against rotation in said body, said screw element being eccentrically disposed in said jaws to provide wide gripper surfaces at lower portions thereof, said screw element having a centrally reduced shank, the key bar being of greater length than the diameter of said disc portion, in the axis of said screw element being offset upwardly with respect to the axis of said jaws to provide deep gripper surfaces at lower adjacent portions of said jaws, and the outer end portions of the screw element having common square sockets.

7. A chuck device of the character described comprising a chuck body, a pair of jaws mounted for movement transversally of said body, means for feeding the jaws toward and from each other, to move said jaws into operative and inoperative positions, means completely housed and concealed within the chuck body engaging said jaws to key jaws against rotation in said body, and said last named means comprising a key element having a part keyed within the chuck body and a key bar operating in alined key grooves on adjacent portions of said jaws.

8. A chuck device of the character described comprising a chuck body, a pair of jaws mounted for movement transversally of said body, means for feeding the jaws toward and from each other, to move said jaws into operative and inoperative positions, means completely housed and concealed within the chuck body engaging said jaws to key jaws against rotation in said body, said last named means comprising a key element having a portion engaging the chuck body to aline the element in said body, and said element having a portion engaging both of said jaws.

9. A chuck device of the character described comprising a chuck body, a pair of jaws mounted for movement transversally of said body, means for feeding the jaws toward and from each other, to move said jaws into operative and inoperative positions, means completely housed and concealed within the chuck body engaging said jaws to key jaws against rotation in said body, said last named means comprising a key element having a portion engaging the chuck body to aline the element in said body, said element having a portion engaging both of said jaws, said first named means comprising a left and right hand screw having common socket ends, and the common socket ends of said screw and central location of the key element in said body establishing a balanced arrangement of parts in said chuck body.

10. In chuck devices comprising a body having a pair of tool engaging jaws movable transversely of said body, a key element for keying said jaws against rotation in said body, said element comprising a disc portion engaging the chuck body for centralized alinement within and retention against radial movement, an elongated key bar projecting centrally from one surface of the disc portion and having ends protruding beyond the periphery of the disc portion, and said bar engaging both of said jaws in keying the jaws in said body.

LOUIS IRRGANG.

References Cited in the file of this patent

UNITED STATES PATENTS

| Number | Name | Date |
|---|---|---|
| 1,775,992 | Emrick | Sept. 16, 1930 |
| 1,873,476 | Procunier | Aug. 23, 1932 |
| 2,159,162 | Johnson | May 23, 1939 |
| 2,237,875 | Brown | Apr. 8, 1941 |